United States Patent [19]
Gross et al.

[11] Patent Number: 5,612,400
[45] Date of Patent: Mar. 18, 1997

[54] SILICONE PRESSURE SENSITIVE ADHESIVE COMPOSITIONS AND METHOD FOR MAKING

[75] Inventors: David C. Gross; Shaow B. Lin, both of Schenectady; Peter M. Miranda, Glenville, all of N.Y.

[73] Assignee: General Electric Company, Waterford, N.Y.

[21] Appl. No.: 470,860

[22] Filed: Jun. 6, 1995

[51] Int. Cl.$^6$ ........................ C08K 5/54
[52] U.S. Cl. .................... 524/268; 524/588; 524/398
[58] Field of Search ........................ 524/266, 268

[56] References Cited

U.S. PATENT DOCUMENTS

| | | | |
|---|---|---|---|
| 2,676,182 | 4/1954 | Daudt . | |
| 3,098,836 | 7/1963 | Bohear . | |
| 4,016,328 | 4/1977 | Horning | 428/358 |
| 4,309,250 | 1/1982 | Blizzard | 525/477 |
| 4,898,920 | 2/1990 | Lee et al. | 525/477 |
| 5,162,410 | 11/1992 | Sweet | 524/266 |
| 5,246,997 | 9/1993 | Sweet | 524/266 |
| 5,324,806 | 6/1994 | Wengrovius et al. | 528/10 |
| 5,352,722 | 10/1994 | Sweet et al. | 524/266 |
| 5,357,007 | 10/1994 | Wengrovius et al. | 525/478 |

*Primary Examiner*—Ralph H. Dean
*Attorney, Agent, or Firm*—Kenneth S. Wheelock

[57] ABSTRACT

Silicone pressure sensitive adhesive compositions are provided which are free of volatile organic solvents. Silicone fluids in the form of cyclic or linear organosiloxanes, and having a boiling point at atmospheric pressure of 250° C. or less, are used in combination with an organopolysiloxane gum and an organosiloxane hydrolyzate of $SiO_2$ units and triorganosiloxy units.

12 Claims, No Drawings

SILICONE PRESSURE SENSITIVE ADHESIVE COMPOSITIONS AND METHOD FOR MAKING

BACKGROUND OF THE INVENTION

The present invention relates to silicone compositions which are substantially free of volatile organic compounds (VOC) and useful as pressure sensitive adhesives (PSAs). More particularly, the present invention relates to the use of silicone fluids in the form of linear, or cyclic organosiloxanes, as non-polluting recyclable carriers in silicone PSA compositions.

As shown by Wengrovious et al., U.S. Pat. Nos. 5,357,007, and 5,324,806, solventless PSAs can be made by blending a spray dried benzene soluble copolymer of $SiO_2$ units and $(R)_3SiO_{1/2}$ units with a fluid network mixture of an alkenyl siloxane and silicon hydride and a hydrosilylation catalyst, where R is a $C_{(1-13)}$ monovalent organic radical. Volatile organic compounds, such as toluene, can be eliminated by the spray drying of an organic solvent dispersion of an organosiloxane hydrolyzate of $SiO_2$ units, or "Q", chemically combined with $(R)_3SiO_{1/2}$ units, or "M", to produce a silicone compatible MQ resin powder which has an organo to silicon ratio of about 0.5 to about 1.5.

Additional techniques are constantly being evaluated to provide commercial mixtures useful in making silicone pressure sensitive adhesives which are free of polluting, and volatile organic compounds.

The present invention is based on the discovery that a recyclable volatile silicone fluid having a boiling point of 250° C., or below, such as a linear organosiloxane, or a cyclic organosiloxane, can be used effectively as a solvent for a silicone PSA composition. For example, the organic solvent dispersion of an organosiloxane hydrolzate of $SiO_2$ units and $(R)_3SiO_{1/2}$ units made by the method of Daudt et al., U.S. Pat. No. 2,676,182, can be vacuum-dried, and the resulting MQ resin can be redissolved in a volatile silicone fluid as previously discussed. A high viscosity organopolysiloxane, for example, a silicone gum having a viscosity of at least 500,000 centipoise, then can be combined with the silicone fluid-MQ resin solution and further processed to form an environmentally safe silicone PSA composition. In addition, the silicone PSA compositions of the present invention, are preferably free of SiH containing organosiloxane which is required in PSA compositions based on a hydrosilylation cure.

STATEMENT OF THE INVENTION

There is provided by the present invention, a silicone PSA composition comprising by weight, (1) 100 parts of an organopolysiloxane having a viscosity of at least 500,000 centipoise at 25° C., (2) 60 to 300 parts of an organosiloxane hydrolyzate comprising $SiO_2$ units chemically combined with triorganosiloxy units, which organosiloxane hydrolyzate has about 0.2% to about 5% by weight of silicon bonded hydroxy radicals, and a ratio of 0.6:1 to 1.2:1 of triorganosiloxy units to $SiO_2$ units, and (3) 20 to 2500 parts, and preferably 40 to 1200 parts, of a linear or cyclic volatile organosiloxane fluid having a boiling point in the range of about 95° C. to about 250° C., where the organo radicals of the silicone PSA composition are selected from $C_{(1-13)}$ organo radicals which are attached to silicon by carbon-silicon linkages.

DETAILED DESCRIPTION OF THE PRESENT INVENTION

The $C_{(1-13)}$ organo radicals attached to silicon by carbon-silicon linkages of the silicone PSA are for example, $C_{(1-13)}$ monovalent hydrocarbon radicals, for example, $C_{(1-8)}$ alkyl such as, methyl, ethyl, propyl, and butyl; alkenyl radicals, for example, vinyl, and alkyl; haloalkyl, such as chloromethyl and trifluoropropyl; aryl radicals such as phenyl, tolyl, xylyl and naphthyl; haloaryl, for example, chlorophenyl.

The organopolysiloxane shown as (1) in the Statement Of The Invention, can be in the form of a "gum" having a viscosity of at least 500,000 centipoise and up to about $200 \times 10^6$ centipoise at 25° C.; it can have an average of about 1.99 to about 2.01 organo radicals per silicon atom, and preferably consist of at least 75 mole percent of dimethylsiloxy units. It is also preferred that the organopolysiloxane have an average of from about 0.05 to about 20 mole percent of alkenyl radicals, such as vinyl, based on the total moles of diorgano siloxy units present. One method for making the polydiorganosiloxane gum is by equilibrating a mixture of a cyclic polydiorganosiloxane and a cyclic organoalkenylsiloxane in the presence of a base catalyst using a procedure similar to the process shown in Bobear U.S. Pat. No. 3,098,836, incorporated herein by reference. The organopolysiloxane also can be chain terminated with diorganohydroxysiloxy units, or triorganosiloxy units utilizing a source of chain terminator during equilibration, such as a hexaorganodisiloxane.

The source material for the organosiloxane hydrolyzate or "MQ resin" can be made by the method of Daudt U.S. Pat. No. 2,676,182, which is incorporated herein by reference. For example, a triorganosilane, such as trimethylchlorosilane can be added as an organic solvent solution to an aqueous solution of an alkali metal silicate which has been treated with hydrochloric acid. After the MQ resin has formed, it can be stripped of volatiles, and dissolved in the polydiorganosiloxane oil, which can be a low boiling cyclic or linear material.

The volatile organosiloxane fluids can be prepared in several ways. One way is to cohydrolyze a mixture of difunctional and monofunctional organohalosilanes, such as dimethyldichlorosilane and trimethylchlorosilane. There can be formed hexamethyldisiloxane and cyclic dimethylsiloxanes, such as hexamethylcyclotrisiloxane and octamethylcyclotetrasiloxane. Higher linear and cyclic polydiorganosiloxane fluids can be obtained by utilizing an effective amount of an equilibration catalyst such as sulfuric acid at room temperature. The mixture can be agitated followed by washing and drying the resulting fluid. Additional linear and cyclic organosiloxane fluids which can be used in the practice of the invention are shown on pages 184–186, by Rochow, Chemistry of the Silicones Second Edition, John Wiley & Sons, Inc. New York (1951), which is incorporated herein by reference.

In the preparation of the silicone PSA composition, the order of addition of the various ingredients is not critical. For example, a solution of the MQ resin in the volatile organsiloxane fluid can be combined with the organopolysiloxane gum using conventional blending techniques. An additional amount of the organopolysiloxane fluid can be added if necessary to achieve the desirable viscosity for a particular application.

If desired, certain of the components of the PSA composition, such as the gum and the MQ resin, can be intercondensed in the presence of the volatile organopolysiloxane fluid. The PSA composition can be catalyzed with about 10 ppm to 30 ppm of an alkaline material such as an alkali metal hydroxide, for example NaOH. The resulting mixture can be heated to a temperature of about 80° C. to 180° C., for example 150° C. to the boiling temperature of the organosiloxane fluid for about 1 to 8 hours. The base catalyst can then be neutralized with a weak acid such as phosphoric.

The preferred manner of curing the silicone PSA composition is by the use of a free-radical initiator, such as an organic peroxide. The organic peroxide can be used at from about 0.5 to about 3.0 parts by weight of the free-radical initiator, per 100 parts of the PSA composition. Suitable organic peroxides are benzoyl peroxide, 2,4-dichloro benzoyl peroxide, or a phenylazo initiator, such as 2,4-dimethyl-4-methoxyvaleronitrile. A small amount of an aromatic organic solvent, such as toluene, can be used if necessary to facilitate the incorporation of the initiator.

Additional ingredients, such as rare earth metal salts, for example, carboxylates and particularly octoates of rare earth metals, such as cerium, or elements of the lanthanide series having atomic weights in the range of 57–71 also can be added if desired. These rare earth metal carboxylate salts have been found to be effective as stabilizers. An effective amount is from about 10 ppm to 300 ppm, based on the weight of the PSA composition.

In a typical PSA application, the silicone PSA composition can be applied onto various substrates by conventional coating methods such as knife-over-roll coating, gravure, Mayer rod, and single to multiple roll coater. Some of the substrates include for example, thermoplastic face stocks like polycarbonates, polyesters, and materials, such as polyimides, Teflon resin and glass cloth. The volatile silicone fluid can stripped at a temperature of about 95° C. to about 250° C. from the coated substrate in an air-circulating oven or furnace. The silicone fluid can be recovered for reuse or incinerated if desired.

In order that those skilled in the art will be better able to practice the present invention, the following examples are given by way of illustration and not by way of limitation. All parts are by weight unless otherwise indicated.

EXAMPLE 1

A silicone PSA composition was prepared by stirring a mixture consisting of 72.6 parts of a dimethylhydroxy terminated polydimethylsiloxane gum having a viscosity of 20.8 million centipoise, 157.6 parts of decamethylcyclopentasiloxane, and 194.5 parts of a separately prepared MQ resin solution in decamethylcyclopentasiloxane. The MQ resin solution had a viscosity of about 79 centistokes and contained 52.5% by weight of the MQ resin. The MQ resin consisted of chemically combined $SiO_2$ units and $(CH_3)_3SiO_{1/2}$ units, and had about 2 wt. % of silanol based on resin solids and an approximate ratio of 0.7 $(CH_3)_3SiO_{1/2}$ unit, per $SiO_2$ unit. The mixture was stirred until a homogeneous solution was obtained. The resulting silicone PSA, "PSA 1" was an adhesive composition having 40% solids, a viscosity of 26000 centipoise and consisted of about 56 parts of MQ resin and 44 parts of dimethylhydroxy terminated polydimethylsiloxane gum. The same procedure was repeated to make "PSA 2", which had 58 parts of MQ resin, and 44 parts of the dimethylhydroxy terminated polydimethylsiloxane gum. PSA 2 had a viscosity of 18,700 centipoise and 40% solids.

EXAMPLE 2

Additional PSA compositions were prepared following similar procedures shown in example 1. "PSA 3" was prepared by mixing 122.6 g of a 35.9 wt. % solution in octamethylcyclotetrasiloxane, of the above dimethylhydroxy terminated polydimethylsiloxane gum with 91.95 g of the 52.5% by weight of the MQ resin solution having a viscosity of about 79 centistokes as described above. An additional 35.4 g of octamethylcyclotetrasiloxane was added. The resulting silicone PSA had a viscosity of 32,400 centipoise and 39.3% solids. It consisted of 56 parts of MQ resin and 44 parts of dimethylhydroxy terminated polydimethylsiloxane gum. "PSA 4" was prepared following a similar procedure. It had a viscosity of 30,900 centipoise, a 55.2% solids in hexamethyldisiloxane and a ratio of 56 parts of MQ resin to 44 parts of gum.

EXAMPLE 3

A silicone adhesive composition was prepared following the procedure of PSA 1 of example 1, consisting of 56 wt. % of the MQ resin, and 44 wt. % of the dimethylhydroxy terminated polydimethylsiloxane gum in decamethylcyclopentasiloxane or "pentamer". After a homogeneous mixture was obtained, the mixture was catalyzed with 15 ppm of KOH. It was heated with agitation after a nitrogen purge to 130° C. and held for 2 hours. It was then cooled and neutralized with phosphoric acid. Additional pentamer was added to produce a silicone PSA having a viscosity of 102,000 centipoise at 50 wt. % solids or 80,000 centipoise at 40 wt. % solids.

A similar silicone adhesive composition was prepared following the same procedure except that toluene was used as the solvent in place of pentamer. The toluene based mixture had 55 wt. % solids and a viscosity in the range of 37,000 to 94,000 at 25° C.

Benzoyl peroxide-crosslinked PSAs were prepared from the above PSAs using 0.24 g of benzoyl peroxide in 2 g of toluene per 30 g of PSA mixture. The peroxide-catalyzed mixtures were coated with a knife coater over a 1 mil polyimide film to a 1.5 to 2 mil thickness. The solvent was flashed from the coated samples in an air-circulating oven, followed by a cure at 175° C. for 3 minutes.

Peel adhesion(oz/in), Tack(g/cm$^2$), and Lap Shear(minutes) of the samples were determined. The peel adhesion was measured at 180 degree peel angle/12 inches/min against a steel plate. Probe tack was measured using a Probe Tack Tester of TMI inc. The lap shear of the adhesive was determined on an un-catalyzed adhesive film having a 1.8 to 2.0 adhesive build over a 2 mil polyester film. The adhesive tape was laid against a clean stainless steel plate with 1"×1" overlap and a 200 g dead weight at the other end of the tape strip which was subjected to a time to failure test in a 70° C. oven. A 15 minute hold was required to pass the test. The following results were obtained:

| Solvent | Peel(oz/in) | Tack( g/cm$^2$) | Lap Shear(min) |
| --- | --- | --- | --- |
| pentamer | 27 | 598 | 105 |
| toluene | 25 | 550 | 30 |

The above results show that the pentamer based PSA tape was substantially equivalent to the toluene based adhesive system.

EXAMPLE 4

Following the procedure of example 3, additional peroxide catalyzed PSAs were prepared from the adhesive compositions, PSA 1 and 2 of example 1, and PSA 3 and 4 of example 2. A 1 mil polyester film was used to provide an adhesive build of 1.8–2.0 mil thickness for peel and probe tack adhesion tests. The following results were obtained, where "per" in PSAs 1–4, is intended to mean peroxide catalyzed:

| | | Cured Adhesive | | | |
|---|---|---|---|---|---|
| Peel | PSA | Tack | Peel | Uncured Adhesive | |
| (oz/in) | (per) | (g/cm$^2$) | (oz/in) | Tack(g/cm$^2$) | Lap Shear(min) |
| 1 | 26.0 | 111 | 28.3 | 25.0 | 512 |
| 2 | 35.0 | 0 | 28.9 | 24.0 | 511 |
| 3 | 40.0 | 160 | 15.9 | 11.5 | 483 |
| 4 | 39.5 | 759 | 24.4 | 29.0 | 649 |

The above results show that useful PSAs can be made which are substantially free of volatile organic compounds based on the ability to readily effect the removal of volatile silicone0 fluids at temperatures in the range of 95° C. to 250° C. at ambient pressures.

What is claimed is:

1. A silicone PSA composition comprising by weight, (1) 100 parts of an organopolysiloxane having a viscosity of at least 500,000 centipoise at 25° C., (2) 60 to 300 parts of an organosiloxane hydrolyzate comprising $SiO_2$ units chemically combined with triorganosiloxy units having about 0.2% to about 5% of silicon bonded hydroxy radicals, and a ratio of 0.6:1 to 1.2:1 of the triorganosiloxy units to $SiO_2$ units, and, (3) 20 to 2500 parts of a linear or cyclic volatile organosiloxane fluid having a boiling point in the range of about 95° C. to about 250° C., where the organo radicals of the silicone PSA composition are selected from $C_{(1-13)}$ organo radicals which are attached to silicon by carbonsilicon linkages.

2. A silicone PSA composition in accordance with claim 1, where the organopolysiloxane of (1) is a polydimethylsiloxane gum.

3. A silicone PSA composition in accordance with claim 1, where the organosiloxane hydrolyzate consists essentially of $(CH_3)_3SiO_{1/2}$ units and $SiO_2$ units.

4. A silicone PSA composition in accordance with claim 1, where the volatile organosiloxane fluid is a linear polydimethylsiloxane.

5. A silicone PSA composition in accordance with claim 1, where the volatile organosiloxane fluid is a cyclic polydimethylsiloxane.

6. A silicone PSA composition in accordance with claim 1, which is peroxide catalyzed.

7. A silicone PSA composition in accordance with claim 1, which has been heated to a temperature of from about 80° C. to about 180° C. in the presence of 3 ppm to 60 ppm of an alkali metal hydroxide for about 1 hour to 8 hours followed by treatment with a neutralizing amount of an acidic catalyst.

8. A silicone PSA composition in accordance with claim 1, where the organopolysiloxane of (1) is a poly(dimethylsiloxydiphenylsiloxy) gum.

9. A silicone PSA composition in accordance with claim 7, which is peroxide catalyzed.

10. A silicone PSA composition in accordance with claim 1, where the volatile organosiloxane fluid is present in the range of from 40 to 1200 parts.

11. A silicone PSA composition in accordance with claim 1 having a stabilizing amount of a rare earth metal carboxylate salt.

12. A silicone PSA composition in accordance with claim 11, where the rare earth metal carboxylate salt is cerium octoate.

* * * * *